United States Patent [19]

Kawamura et al.

[11] Patent Number: 5,256,513
[45] Date of Patent: Oct. 26, 1993

[54] ELECTROCONDUCTIVE MAGNETIC CARRIER, DEVELOPER USING THE SAME AND IMAGE FORMATION METHOD

[75] Inventors: Takao Kawamura, 17-11, 1-cho, Takakuradai, Sakai-shi, Osaka-fu; Yasuo Nishiguchi, Tokyo; Yoshio Ozawa, Watarai; Yukio Ikeda, Watarai; Katsuhiro Yoshioka, Watarai; Hiroshi Itoh, Yohkaichi, all of Japan

[73] Assignees: Kyocera Corporation, Kyoto; Takao Kawamura, Osaka, both of Japan

[21] Appl. No.: 815,805

[22] Filed: Dec. 30, 1991

[30] Foreign Application Priority Data

Dec. 28, 1990 [JP] Japan .................................. 2-417074
Jul. 23, 1991 [JP] Japan .................................. 3-207554
Oct. 1, 1991 [JP] Japan .................................. 3-280870

[51] Int. Cl.$^5$ ............................................. G03G 9/083
[52] U.S. Cl. .................................. 430/106.6; 430/108
[58] Field of Search ...................... 430/106, 106.6, 108

[56] References Cited

U.S. PATENT DOCUMENTS

| | | | |
|---|---|---|---|
| 4,791,041 | 12/1988 | Aoki et al. | 430/108 |
| 4,868,082 | 9/1989 | Kohri et al. | 430/106.6 |
| 4,898,801 | 2/1990 | Tachibana et al. | 430/108 |
| 5,108,862 | 4/1992 | Kishiraoto et al. | 430/108 |

FOREIGN PATENT DOCUMENTS

| | | |
|---|---|---|
| 63-186254 | 8/1988 | Japan . |
| 21878 | 1/1990 | Japan . |
| 243566 | 2/1990 | Japan . |
| 269770 | 3/1990 | Japan . |

Primary Examiner—John Goodrow
Attorney, Agent, or Firm—Spensley Horn Jubas & Lubitz

[57] ABSTRACT

An electroconductive magnetic carrier which is composed of basic particles, each of the basic particles comprising a binder resin and a magnetic material dispersed in the binder resin, and an electroconductive layer formed on the surface of the basic particle, a developer which is composed of the above electroconductive magnetic carrier and (b) an electrically insulating toner, and an image formation method of forming toner images on a photoconductor by using this developer are described.

34 Claims, 3 Drawing Sheets

ELECTROCONDUCTIVE MAGNETIC CARRIER, DEVELOPER USING THE SAME AND IMAGE FORMATION METHOD

BACKGROUND OF THE INVENTION

1. Field of the Invention

The present invention relates to electroconductive magnetic carrier particles, a developer comprising the carrier particles and an electrophotographic image formation method using such a developer for use with a printer, facsimile apparatus and digital copying apparatus.

2. Discussion of Background

According to the electrophotographic image formation method based on the Carlson process, which is now widely employed, image formation is basically carried out in such a manner that the surface of a photoconductor is uniformly charged to a predetermined polarity and the photoconductor thus charged is selectively exposed to the original light images to form latent electrostatic images on the photoconductor. Then, the latent electrostatic images are developed with a developer, so that visible toner images can be obtained on the photoconductor. The visible toner images are then transferred to a sheet of an image-receiving medium and fixed thereon.

On the other hand, many proposals on the image formation method not using the Carlson process, but using the rear side exposure system have been reported, for example, in The Journal of the Institute of Image Electronics Engineers of Japan vol. 16, (5), 306 (1987); and Japanese Laid-Open Patent Applications 61-149968, 63-10071 and 63-214781, by which rear side exposure system the image formation apparatus can be made compact and the image formation process can be made simple.

In the rear side exposure system, the surface of the photoconductor is provided with a developer to form a developer resident portion, through which the photoconductor is subjected to a cleaning operation, and the photoconductor is uniformly charged. The light images are applied to the photoconductor from the rear side thereof and the latent images formed on the surface of the photoconductor are simultaneously developed into toner images with the developer.

However, there are too many difficult problems in the rear side exposure system to put it into practice. More specifically, the requirements for each function in the rear side exposure system are made extremely severe because it is necessary to inject the electric charge sufficient for the development into the photoconductor through the developer accumulated in the developer resident portion and to form sharp and stable toner images on the photoconductor by development at a relatively small developer resident portion.

In addition, it is necessary to impart the electroconductivity to the developer since the electric charge is injected into the photoconductor through the developer. Therefore, when a developer to be employed is a one-component type developer, an electroconductive magnetic toner is essentially required. The toner image thus formed on the photoconductor cannot be transferred to a sheet of plain paper by the electrostatic image transfer method such as corona transfer or bias roller transfer. As a result, only a sheet of paper with high resistivity can be used in this system.

The method of forming a multi-color recording image on a sheet of plain paper by the rear side exposure system is disclosed in Japanese Patent Publication 60-59592. In this method, however, since a photoconductor is prepared by overlaying an insulating layer on a photoconductive layer, the photoconductor cannot stand the repetition of formation of multi-color images thereon. To solve this problem, it is proposed that the residual latent image formed on the photoconductor be erased by application thereto of a transfer electrical field. This proposal is still insufficient in practice for obtaining clear images over an extended period of time.

As in the Journal of the Institute of Electrophotography Engineers of Japan vol. 27, No. 3, p.442 (1988) and Japanese Laid-Open Patent Application 61-46961, the image formation can be achieved by the rear side exposure and the simultaneous development system, with the application of a charging bias and a development bias to a photoconductor, having counter polarities, using a two-component type developer comprising iron carrier particles with a resistivity of $10^4$ to $10^8$ $\Omega$·cm and magnetic toner particles with insulating properties.

However, when the above-mentioned image formation method is applied to the practically-used copying apparatus, it is difficult to control the image formation system for obtaining a clear image over an extended period of time, and in addition, the structure of the apparatus necessarily becomes complicated.

Furthermore, the image formation methods by use of a magnetic carrier prepared by dispersing a magnetic material in a binder resin are disclosed. For example, a developer comprising the above-mentioned magnetic carrier and an electrically insulating non-magnetic toner is employed in Japanese Laid-Open Patent Applications 53-33152 and 55-41450; and a developer comprising the above-mentioned magnetic carrier and an electrically insulating magnetic toner is employed in Japanese Laid-Open Patent Applications 53-33152, 53-33633 and 53-35546. In these disclosures, the carrier component in a developer has insulating properties and the development is carried out by the conventional Carlson process.

SUMMARY OF THE INVENTION

Accordingly, a first object of the present invention is to provide a carrier having high electroconductivity and a great magnetic force for use in a developer.

A second object of the present invention is to provide a developer by which the rear side exposure system can be satisfactorily carried out.

A third object of the present invention is to provide an image formation method using the rear side exposure system, by which method the electric charge can be readily injected into a photoconductor, a latent electrostatic image can be satisfactorily developed with a developer, and the obtained toner image can be easily transferred to a sheet of an image-receiving medium.

The first object of the invention can be achieved by an electroconductive magnetic carrier for use with a developer comprising basic particles, each of the basic particles comprising a binder resin and a magnetic material dispersed in the binder resin, and an electroconductive layer formed on the surface of the basic particle.

The second object of the invention can be achieved by a developer comprising (a) an electroconductive magnetic carrier comprising basic particles, each of the basic particles comprising a binder resin and a magnetic material dispersed in the binder resin, and an electroconductive layer formed on the surface of the basic particle, and (b) an electrically insulating toner. The developer thus obtained has electroconductivity and is capable of producing a toner image with insulating properties, thereby enabling the toner image to be transferred to a sheet of plain paper by electrostatic transfer without difficulty.

The third object of the present invention can be achieved by an image formation method of forming a toner image corresponding to a light image on a photoconductor by use of (a) a photoconductor which comprises a light-transmitting support, and at least a light-transmitting electroconductive layer and a photoconductive layer which are successively overlaid on the light-transmitting support, (b) a developer comprising an electroconductive magnetic carrier comprising basic particles, each of the basic particles comprising a binder resin and a magnetic material dispersed in the binder resin, and an electroconductive layer formed on the surface of the basic particle, and an electrically insulating toner, (c) a development means which is disposed on the side of the photoconductive layer of the photoconductor and supplies the developer onto the surface of the photoconductor, (d) a voltage application means for applying a voltage across the light-transmitting electroconductive layer of the photoconductor and the development means, and (e) an exposure means which is disposed on the side of the light-transmitting support of the photoconductor in such a configuration as to be directed toward the development means, comprising the steps of:

bringing the developer into contact with the surface of the photoconductor; and applying a light image to the photoconductive layer located near a position where the light-transmitting support and the development means are mutually directed, from the side of the light-transmitting support, under the application of a voltage across the light-transmitting electroconductive layer and the development means.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
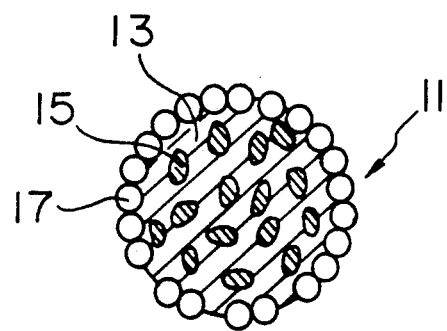
FIG. 1 is a schematic cross-sectional view of one embodiment of a carrier particle according to the present invention.

FIG. 1 is a schematic cross-sectional view of one embodiment of a carrier particle according to the present invention.

In FIG. 1, a carrier particle 11 comprises (i) a basic particle 13 comprising a binder resin and magnetic particles 15 dispersed in the above-mentioned binder resin, and (ii) an electroconductive layer comprising electroconductive finely-divided particles 17 formed on the basic particle.

In the carrier particle as shown in FIG. 1, it is not always necessary to coat the overall surface of the basic particle 13 with the electroconductive layer. Namely, an electroconductive part may be at least formed on the surface of the basic particle 13 so as to impart the sufficient electroconductivity to the carrier particle. As shown in FIG. 1, therefore, the surface of the basic particle 13 may be partially exposed without the electroconductive layer. In addition, part of the magnetic particles 15 may protrude over the surface of the basic particle 13.

Examples of the binder resin contained in the basic particle 13 of the carrier particle 11 according to the present invention are vinyl resins such as polystyrene resin, polyester resins, nylon resins and polyolefin resins.

As the magnetic particle 15 for use in the basic particle 13 of the carrier particle, a spinel ferrite such as magnetite or gamma-iron-oxide; a spinel ferrite comprising at least one metal, except iron, such as Mn, Ni, Mg or Cu; a magnetoplumbite-type ferrite such as barium ferrite; and finely-divided particles of iron or alloys thereof having a surface oxidized layer can be employed in the present invention. The shape of the magnetic particle 15 may be a granule, a sphere or a needle.

In the case where the carrier particle of the present invention is required to be highly magnetized, finely-divided particles of a strongly magnetic substance such as iron may be employed. It is preferable that finely-divided particles of the strongly magnetic substance, that is, the above-mentioned spinel ferrite such as magnetite or gamma-iron-oxide, and magnetoplumbite-type ferrite such as barium ferrite be used as the magnetic particle 15 for use in the basic particle 13, with the chemical stability taken into consideration.

The basic particle 13 having a desired magnetic force can be obtained by appropriately selecting the kind of finely-divided particles of the strongly magnetic substance serving as the magnetic particle 15 and the content thereof in the basic particle 13. It is proper that the amount of the magnetic particle 15 be 70 to 90 wt. % of the total weight of the basic particle 13 in the carrier particle 11 of the present invention.

Examples of the electroconductive finely-divided particles 17 for use in the electroconductive layer of the carrier particle 11 include particles of carbon black, tin oxide, electroconductive titanium oxide which is surface-treated to be electroconductive by coating an electroconductive material on titanium oxide, and silicon carbide. It is desirable that the electroconductive materials not losing its electroconductivity by oxidation in the air be used as the electroconductive finely-divided particles 17.

It is preferable that the average particle diameter of the electroconductive finely-divided particle 17 for use in the carrier particle 11 be 0.5 μm or less, more preferably in the range of 0.01 to 0.2 μm.

To deposit the electroconductive finely-divided particles 17 to the surface of the basic particle 13, for example, the basic particles 13 and the electroconductive finely-divided particles 17 are uniformly mixed in such a fashion that the electroconductive finely-divided particles 17 may adhere to the surface of the basic particle 13. Subsequently, these electroconductive particles 17 are fixed to the basic particle 13 with the application of mechanical or thermal shock thereto, so as not to completely embed the electroconductive particles 17 into the basic particle 13, but to allow part of the electroconductive particles 17 to protrude over the basic particle 13.

In the present invention, since the electroconductive layer is coated on the basic particle 13 by fixing the electroconductive finely-divided particles 17 thereto, as shown in FIG. 1, high electroconductivity can be efficiently imparted to the carrier particle 11. Furthermore, in the present invention, it is not necessary to contain the electroconductive finely-divided particles 17 in the basic particle 13, so that large quantities of the magnetic particles 15 can be contained in the basic particle 13 to increase the magnetic force of the carrier particle 11.

The apparatus for depositing the electroconductive finely-divided particles 17 to the basic particle 13 is commercially available as a surface-modification apparatus or surface-modification system.

For example:
(1) dry-type mechanochemical method
  "Mechanomill" (Trademark), made by Okada Seiko Co., Ltd.
  "Mechanofusion System" (Trademark), made by Hosokawa Micron Corporation
(2) high-velocity impact method
  "Hybridization System" (Trademark), made by Nara Machinery Co., Ltd.
  "Kryptron" (Trademark), made by Kawasaki Heavy Industries, Ltd.
(3) wet-method
  "Dispercoat" (Trademark), made by Nisshin Flour Milling Co., Ltd.
  "Coatmizer" (Trademark), made by Freund Industrial Co., Ltd.
(4) heat-treatment method
  "Surfusing" (Trademark), made by Nippon Pneumatic Mfg. Co., Ltd.
(5) others
  "Spray dry" (Trademark), made by Ohgawara Kakouki Co., Ltd.

Figure 2:
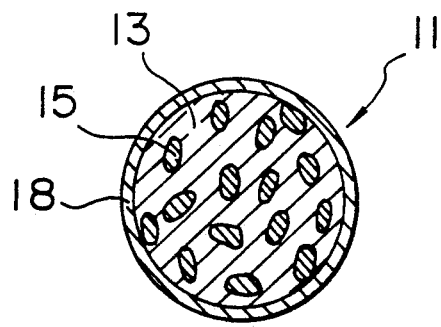
FIG. 2 is a schematic cross-sectional view of another embodiment of a carrier particle according to the present invention.

FIG. 2 is a schematic cross-sectional view of another embodiment of the carrier particle according to the present invention.

A carrier particle 11 as shown in FIG. 2 comprises a basic particle 13 which is prepared by uniformly dispersing magnetic particles 15 in a binder resin, and an electroconductive thin film 18 coated on the above-mentioned basic particle 13.

To form the electroconductive thin film 18 on the basic particle 13, the conventional thin-film forming methods can be employed. For example, a thin film of ITO (indium-tin-oxide), indium oxide, tin oxide, aluminum, nickel, chromium or gold may be formed by CVD method, vacuum deposition or sputtering.

It is preferable that the volume resistivity of the carrier 11 of the present invention be $10^5$ Ω·cm or less, more preferably $10^4$ Ω·cm or less, and further preferably in the range of $10^2$ to $10^4$ Ω·cm. When the volume resistivity of the carrier 11 according to the present invention is within the above range, the electroconductivity of the carrier is not impaired and the electric charge can be readily injected into the photoconductor in such a degree that the charge quantity of the photoconductor reaches a level sufficient for the rear side exposure system. The electroconductivity of the carrier 11 is mainly determined by the electroconductive layer 18.

To measure the volume resistivity of the carrier 11, 1.5 g of carrier particles 11 are placed in a Teflon-made cylinder with an inner diameter of 20 mm, having an electrode at the bottom thereof, and the volume resistivity of the carrier 11 is measured when a counter electrode with an outer diameter of 20 mm is put on the carrier particles, with a load of 1 kg being applied to the top portion of the carrier particles.

The carrier 11 of the present invention is required to have a great magnetic force in some degree. It is preferable that the maximum magnetization (magnetic flux density) of the carrier in a magnetic field of 5 kOe be 55 emu/g or more, more preferably 55 to 90 emu/g, and further preferably 60 to 85 emu/g. In a magnetic field of 1 kOe, the preferable maximum magnetization (magnetic flux density) of the carrier is 40 emu/g or more, more preferably 40 to 60 emu/g, and further preferably 45 to 60 emu/g. When the magnetic force of the carrier 11 is within the above range, the decrease of the transporting performance of the developer can be avoided, and at the same time, the carrier 11 can be prevented from being attracted to the photoconductor together with the toner particles.

It is preferable that the average particle diameter of the carrier 11 be 5 to 100 μm, more preferably 5 to 50 μm, and further preferably 10 to 40 μm. When the particle size of the carrier 11 is within the above range, the surface of the photoconductor can be uniformly charged without any difficulty and the concentration of toner (the amount ratio of the toner component to the carrier component) can be increased. In addition, the decrease of the transporting performance of the developer on a development sleeve can be avoided and the photoconductor can be charged to a predetermined potential.

It is desirable that the true density of the carrier 11 be in the range of 3.0 to 4.5 g/cm$^3$. The bulk density of the carrier 11 is preferably 2.5 g/cm$^3$ or less, more preferably 2.0 g/cm$^3$ or less, and further preferably 1.5 g/cm$^3$ or less.

The developer according to the present invention comprises the above-mentioned carrier and a toner component.

As the toner for use in the developer of the present invention, the conventional electrically insulating toner particles with a volume resistivity of $10^{14}$ Ω·cm or more, preferably $10^{15}$ Ω·cm or more can be employed. The volume resistivity of the toner can be measured by the same method as in the case of the carrier.

The toner for use in the present invention may comprise a binder resin, a coloring agent, a charge controlling agent and an off-set preventing agent. In addition, a magnetic toner can be prepared by using a magnetic material, which is effective for preventing the scattering of toner particles in the image formation apparatus.

As the binder resin for use in the toner, vinyl resins represented by a polystyrene resin, such as styrene-acrylic acid derivative copolymer and polyester resins are usable.

As the coloring agent for use in the toner, a variety of dyes and pigments such as carbon black can be used.

Examples of the charge controlling agent for use in the toner are quaternary ammonium compounds, nigrosine, bases of nigrosine, crystal violet and triphenylmethane compounds.

As the off-set preventing agent or image-fixing promoting assistant, olefin waxes such as low molecular weight polypropylene, low molecular weight polyethylene and modified materials of the above compounds can be employed in the present invention.

As the magnetic material for preparing the magnetic toner, magnetite and ferrite can be used.

In the developer of the present invention, it is preferable that the ratio of the average diameter of a carrier particle to that of a toner particle be 1 to 5, and more preferably 1 to 3. When the ratio of the average diameter of the carrier particle to that of the toner particle is within the above range, the surface area of the carrier particle which is coated with the toner particles can be controlled to increase the toner concentration in the developer. Thus, a decrease in image density can be prevented. The average diameter of the toner particle for use in the present invention is generally 20 μm or less, and preferably 15 μm or less.

The charging characteristics of the toner can be adjusted by depositing the finely-divided chargeable particles to the basic toner particle just like the carrier as shown in FIG. 1.

The volume resistivity of the developer according to the present invention, which can be measured by the same method as in the case of the carrier, is preferably $10^6$ Ω·cm or less, more preferably $10^5$ Ω·cm or less, further preferably in the range of $10^3$ to $10^5$ Ω·cm. When the volume resistivity of the developer is within the above range, the photoconductor can be charged to a sufficient level.

It is preferable that the toner concentration in the developer according to the present invention, that is, the mixing ratio of toner to the carrier, be 10 wt. % or more, more preferably 20 wt. % or more, further preferably in the range of 20 to 50 wt. %. When the toner concentration in the developer is within the above range, the sufficient image density can be obtained when the developer is applied to the image formation method according to the present invention. In addition, the satisfactory charge quantity of the photoconductor can be obtained. According to the image formation method of the present invention, the obtained image density is kept almost constant in a wide range of the toner concentration in the developer, so that it is not necessary to control the toner concentration in practice or the control thereof can be drastically omitted.

Figure 3:
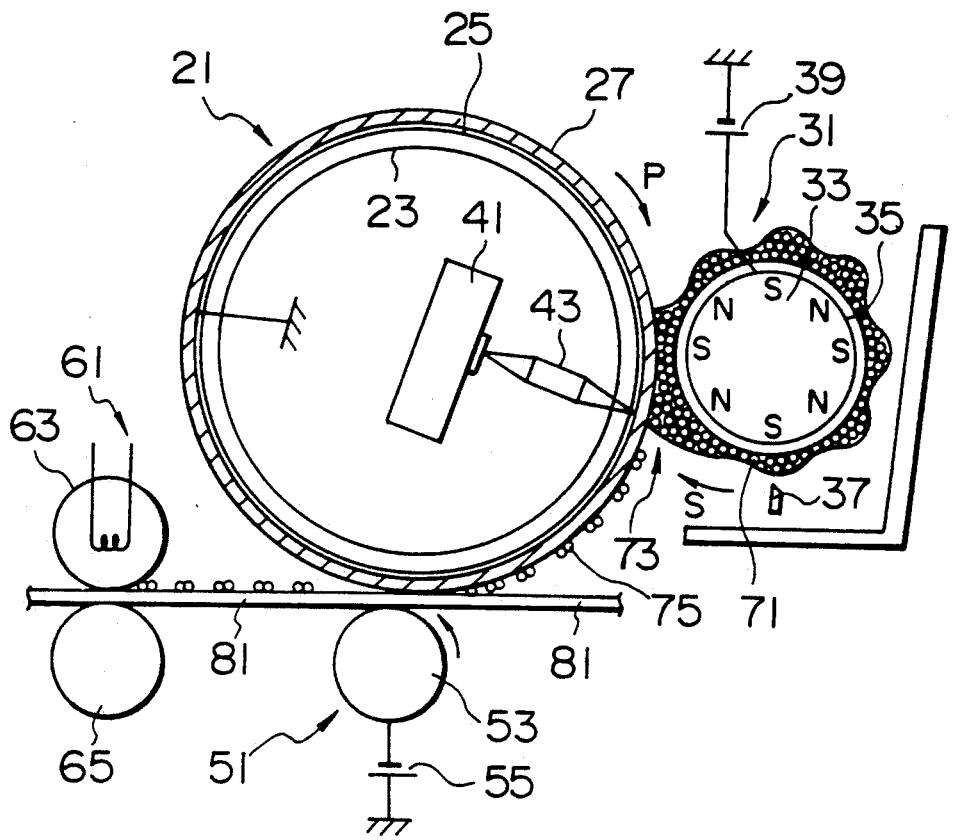
FIG. 3 is a diagram of an image forming apparatus in which the image formation method of the present invention is carried out.

FIG. 3 is a diagram of an image forming apparatus in which the image formation method of the present invention is carried out.

In FIG. 3, a drum photoconductor 21 comprises a hollow cylindrical light-transmitting support 23, for example, made of glass, a light-transmitting electroconductive layer 25 formed on the support 23, and a photoconductive layer 27 formed on the electroconductive layer 25. Instead of the drum photoconductor as shown in FIG. 3, a belt-shaped (sheet-shaped) photoconductor is available in the present invention.

Examples of the material for the photoconductive layer 27 include amorphous silicon (α-silicon), Se-alloys and organic materials. The materials of which sensitivity is high and in which the mobility of the electric charge carrier is high are preferred. With the above points taken into consideration, the amorphous-silicon based photoconductive layer is preferably employed. In particular, a photoconductor prepared by forming at least a light-transmitting electroconductive layer, an amorphous-silicon based photoconductive layer and a carrier-injection preventing top layer successively on a light-transmitting support is preferable.

Figure 4:
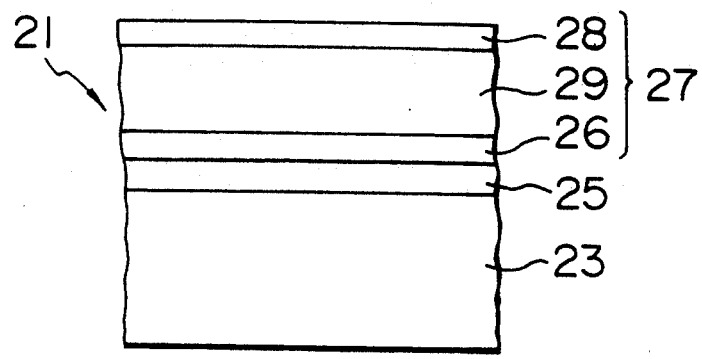
FIG. 4 is a schematic cross-sectional view of a photoconductor for use with the image formation method of the present invention.

FIG. 4 is a schematic cross-sectional view of the amorphous silicon based photoconductor 21 shown in FIG. 3.

The photoconductor 21 shown in FIG. 4 comprises a light-transmitting support 23, a light-transmitting electroconductive layer 25 formed on the support 23, and a photoconductive layer 27 formed on the electroconductive layer 25. The photoconductive layer 27 consists of a first carrier-injection preventing layer 26, an amorphous-silicon based photoconductive layer 29 and a second carrier-injection preventing layer 28.

The first carrier-injection preventing layer 26 can prevent the carrier with a polarity opposite to that of a development bias from injecting into the amorphous-silicon based photoconductive layer 29 from the light-transmitting electroconductive layer 25 when the surface of the photoconductor 21 is brought into contact with a developer 71 to which the development bias voltage is applied. As a result, the noise disturbing the image formation can be eliminated and the electrostatic contrast between a light-exposed portion and a non-exposed portion on the surface of the photoconductor can be increased, thereby improving the image quality of the obtained images and decreasing the fogging on the background of the photoconductor in the course of development.

The first carrier-injection preventing layer 26 is required to have the above-mentioned electrical characteristics for preventing the carrier from injecting from the light-transmitting electroconductive layer 25, and at the same time, to have a high light transmittance, that is, to have a large optical band gap or high light transmission, not for absorbing the light for image-exposure which is applied from the inside of the light-transmitting support 23. Furthermore, the first carrier-injection preventing layer 26 is also required to have good adhesion to the light-transmitting electroconductive layer 25 and the photoconductive layer 29, and have good stability not to undergo the great change when the photoconductive layer 29 is formed thereon by the application of heat thereto.

Examples of the material for the first carrier-injection preventing layer 26 for use in the present invention include amorphous silicon such as amorphous silicon carbide (α-SiC$_x$), amorphous silicon oxide (α-SiO$_x$), amorphous silicon nitride (α-SiN$_x$), α-SiC.O, α-SiC.N, α-SiO.N and α-SiC.O.N; and other organic materials such as polyethylene terephthalate, Parylene, polytetrafluoroethylene, polyimide, polyfluoroethylenepropylene, urethane resin, epoxy resin, polyester resin, polycarbonate resin and cellulose acetate.

In the amorphous-silicon based carrier-injection preventing layer, the content of an element such as C, N or O can be changed in the thickness direction of the layer.

In addition, the p-type or n-type semiconductive amorphous based silicon layer can be used as the first carrier-injection preventing layer 26. In this case, the element of C, O or N may be contained in the carrier-injection preventing layer 26 in order to increase the optical band gap and the adhesion to the light-transmitting electroconductive layer 25 and the photoconductive layer 29, and a doping agent may be contained therein to prevent the carrier from injecting from the light-transmitting electroconductive layer 25.

It is recommendable that an element belonging to the group IIIa in the periodic table (hereinafter referred to as the group IIIa element) be contained in the first carrier-injection preventing layer 26 at a concentration of 1 to 10,000 ppm, more preferably 100 to 5,000 ppm in order to prevent the negative charge carrier from injecting therein. To prevent the positive charge carrier from injecting in the first carrier-injection preventing layer 26, on the other hand, an element belonging to the group Va in the periodic table (hereinafter referred to as the group Va element) may be contained in the first carrier-injection preventing layer 26 at a concentration of 5,000 ppm or less, more preferably in the range from 300 to 3,000 ppm.

When the above-mentioned element is contained in the first carrier-injection preventing layer 26, the content of the element may be distributed with some gradation in the thickness direction of the layer 26. In such a case, the average concentration of the element in the layer 26 may be within the above range.

As previously mentioned, when the group IIIa element is contained in the first carrier-injection preventing layer 26, a development bias with a positive polarity is employed; and when the group Va element is contained in the first carrier-injection preventing layer 26, a bias with a negative polarity is employed for development.

As the preferable examples of the IIIa group element and the Va group element, boron (B) and phosphorus (P) can be respectively used because these elements are so excellent in the covalent bonding performance with silicon (Si) in the layer 26 that the semiconductive characteristics of the layer 26 can be sensitively changeable, and the capability of preventing the carrier from injecting therein is remarkably improved.

It is preferable that the thickness of the first carrier-injection preventing layer 26 be 0.05 to 5 μm, more preferably 0.1 to 3 μm. When the thickness of the first carrier-injection preventing layer 26 is within the above range, the injection of the carrier can be readily prevented and the light for exposure is not absorbed, thereby allowing the α-silicon based photoconductive layer 29 to efficiently generate the photocarriers. In addition, the increase in the residual potential can be prevented.

The α-silicon based photoconductive layer 29 can be formed on the first carrier-injection preventing layer 26, for example, by the glow discharge method, sputtering method, ECR method or vacuum-deposition method.

In forming the α-silicon based photoconductive layer 29, it is preferable that hydrogen (H) or a halogen be contained in an amount of 1 to 40 atom. % for treatment of the terminal of the dangling bond. Further, to obtain the predetermined electrical characteristics such as the electroconductivities in the dark and the light and the desired optical band gap, it is recommendable that the group IIIa element, the group Va element, and the element of C, N or O be contained in the α-silicon based photoconductive layer 29. As the preferable examples of the IIIa group element and the Va group element, boron (B) and phosphorus (P) are respectively preferable because these elements are so excellent in the covalent bonding performance with silicon (Si) in the photoconductive layer 29 that the semiconductive characteristics of the layer 29 can be sensitively changeable, and the improved photosensitivity can be obtained.

In particular, when the photoconductive layer 29 comprises α-Si.C, it is preferable to satisfy the relationship of $0 < x \leq 0.5$ in the composition of $Si_{1-x}C_x$, more preferably, the relationship of $0.05 \leq x\ 0.45$. This is because the resistivity of the thus obtained α-Si.C photoconductive layer 29 becomes high and the mobility of the carrier is further improved when compared with the α-Si photoconductive layer 29.

Furthermore in the present invention, a function-separating α-Si based photoconductive layer 29 consisting of a light-excitation layer capable of mainly generating the photocarriers and a carrier-transport layer capable of transporting the generated carriers is employed, the photosensitivity, the electrostatic contrast and the dielectric strength can be improved.

In forming the light-excitation layer of the above-mentioned function-separating type photoconductive layer 29, it is recommended that the following points be taken into consideration to permit the light-excitation layer to efficiently generate the photocarriers:

(1) to decrease the film-forming speed;
(2) to increase the dilution ratio by use of $H_2$ and He; and
(3) to increase the content of elements which are doped in the light-excitation layer as compared with that in the carrier-transport layer.

The carrier-transport layer mainly serves to increase the dielectric strength of the photoconductor 21 and to smoothly transport the carriers which are injected from the light-excitation layer to the surface of the photoconductor 21. In this carrier-transport layer, the carriers are also generated from the light transmitted through the light-excitation layer. Thus, the carrier-transport layer can also contribute to increase the photosensitivity of the photoconductor 21.

When the above-mentioned function-separating α-Si based photoconductive layer 29 consisting of the light-excitation layer and the carrier-transport layer is employed, it is desirable that the thickness of the light-excitation layer be almost equal to the thickness of a light-absorption layer which can be obtained from the light absorption coefficient with respect to the wavelength of light used for the image-exposure.

The second carrier-injection preventing layer 28 may comprise an organic material or an inorganic material.

Examples of the inorganic material for use in the second carrier-injection preventing layer 28 are α-SiC, α-SiN, α-SiO, α-SiC.O and α-SiN.O. Using such materials, the second carrier-injection preventing layer 28 may be formed on the photoconductive layer by the conventional thin film forming methods.

In particular, when the second carrier-injection preventing layer 28 comprises 60 -Si.C, it is preferable to satisfy the relationship of $0.3 < x < 1.0$ in the composition of $Si_{1-x}C_x$, more preferably the relationship of $0.5 \leq x \leq 0.95$, further preferably the relationship of $0.6 \leq x \leq 0.95$.

The thickness of the second carrier-injection preventing layer 28 is generally in the range of 0.05 to 5 μm, preferably 0.1 to 3 μm, and more preferably 0.1 to 2 μm.

When the thickness of the second carrier-injection preventing layer 28 is within the above range, the image density can be sufficiently increased and the dielectric strength of the photoconductor can be improved, and further, the wear of the photoconductor caused by the repeated operations can be decreased. In addition, even when the delicate pattern of the electric charge is formed on the photoconductor 21, the electrical field, that is, the electric line of force does not spread in the plane direction of the second carrier-injection preventing layer 28, thereby obtaining the images with sufficient resolution. In addition to this, the residual potential of the photoconductor does not elevate because the quantity of the residual electric charge on the surface of the photoconductor does not increase, so that there is no decrease in the image density and fogging on the background, and particularly in the repeated operations, the image density is stabilized and a ghost image is not caused.

The entire thickness of the photoconductive layer 27 thus obtained, which varies depending on the structure of the above-mentioned layers, is approximately 1 to 20 $\mu$m, and preferably 1 to 15 $\mu$m, and more preferably 3 to 10 $\mu$m in the case where the LED or EL (electroluminescence) is used as a light source for exposure. When the thickness of the photoconductive layer 27 is within the above range, the light for exposure can be sufficiently absorbed by the photoconductive layer 27 to show excellent photosensitivity. In addition, the sufficient dielectric strength of the photoconductor can be ensured, so that satisfactory images can be obtained even by application of a low bias voltage to the photoconductor.

As shown in FIG. 3, an LED array 41, serving as an exposure means (image signal exposing apparatus) is disposed inside the light-transmitting support 23 of the photoconductor 21 in such a configuration as to be directed toward a development unit 31, thereby conducting the rear side exposure through an optical transmitter 43 (Selfoc lens array). Instead of the LED array serving as the exposure means, an EL light emitting element array, a plasma light emitting element array, a fluorescent dot array, a shutter array obtained by combining a light source with liquid crystal or PLZT (lead (plomb) lanthanum zirconate titanate), and an optical fiber array can be employed in the present invention.

Around the photoconductor 21, there are situated the development unit 31, an image-transfer unit 51 and an image-fixing unit 61.

The development unit 31, which is disposed with facing the photoconductive layer 27 of the photoconductor 21, serves to supply the surface of the photoconductor 21 with a developer 71. An electroconductive sleeve 35 in the development unit 31 is connected to a development bias source 39 capable of applying a voltage across the light-transmitting electroconductive layer 25 of the photoconductor 21 and the development unit 31. In the development unit 31, a magnetic roller 33 having a plurality of magnetic poles (the N and S poles) is included in the electroconductive sleeve 35. The magnetic roller 33 may be fixed to the inside of the sleeve 35 or designed to be freely rotated therein.

The thickness of the developer 71 on the sleeve 35 is adjusted by a doctor blade 37. In the preferred embodiment of the present invention, the photoconductor 21 and the electroconductive sleeve 35 are respectively rotated in the directions of arrows P and S, and thus the developer 71 is transported to the surface of the photoconductor 21.

When the photoconductor 21 and the electroconductive sleeve 35 of the development unit 31 are driven to rotate in the reverse direction, as previously mentioned, a developer is accumulated at a developer resident portion 73 in a gap between the photoconductor 21 and the sleeve 35, which developer resident portion 73 is located lower than the position where the sleeve 35 of the development unit 31 and the photoconductor 21 are mutually directed (a point "A" illustrated in FIG. 5) in the rotational direction of the photoconductor 21.

The developer resident portion 73 is formed when the developer 71 on the sleeve 35 exceeds the predetermined thickness. The transporting speed of the developer 71 from the sleeve 35 to the photoconductor 21, the thickness of the developer 71 formed on the sleeve 35 and the gap width between the sleeve 35 and the photoconductor 21 may be appropriately determined according to the rotational speed of the photoconductor 21 and the required size of the developer resident portion 73.

As previously described, the developer resident portion 73 can be formed downstream the utmost contact point between the development unit 31 and the photoconductor 21 in the rotational direction of the photoconductor 21 when the photoconductor and the sleeve 35 of the development unit 31 are rotated in the reverse direction. In this case, the development can be achieved steadily and the reproduction performance of the obtained images becomes excellent as compared with the case where the sleeve 35 and the photoconductor 21 are rotated in the same direction, with the circumferential speed of the sleeve 35 being higher than that of the photoconductor 21.

The developer 71 for use in the present invention comprises the previously mentioned electrically insulating toner and carrier which is prepared by forming an electroconductive layer on a basic particle comprising a binder resin and a magnetic material dispersed in the binder resin.

The electroconductive magnetic carrier particles of the present invention constitute a magnetic brush, to which toner particles are attached. When the magnetic toner particles are employed, the toner particles are caused to attach to the carrier particle mainly by means of the magnetic force. In the case of the non-magnetic toner particles, they are caused to attach to the carrier particle by means of the electrostatic charge.

In the image formation procedure, as shown in FIG. 3, the developer 71 is transported from the sleeve 35 to the photoconductor 21 and accumulated at the developer resident portion 73, and the development bias voltage with a positive polarity is applied from the development bias source 39 to the electroconductive sleeve 35. The positively chargeable toner is used in this embodiment, but the chargeability of the toner and the polarity of the development bias voltage may be determined in accordance with the characteristics of the photoconductor 21.

When the photoconductive layer 27 of the photoconductor 21 is brought into contact with the developer 71, the electric charge from the development bias source 39 is injected into the photoconductive layer 27 through the magnetic brush composed of the carrier particles contained in the developer 71. Thus, the residual electric charge remaining on the photoconductor 21 caused by the previous image formation process can be erased and the surface of the photoconductor 21 can be uniformly charged. At the same time, the residual toner particles on the photoconductor 21, which have failed to be transferred to an image-receiving sheet 81 in the image-transfer unit 51, can be removed from the photoconductor 21 by the above-mentioned magnetic brush.

According to the image formation method of the present invention, a light signal corresponding to the original image is applied to the photoconductor, located near a position where the light-transmitting support 23 and the development means 31 are mutually directed, by use of the exposure means such as the LED array 41 which is disposed on the side of the light-transmitting support 23 of the photoconductor 21 in such a configuration as to be directed toward the development unit 31 via the photoconductor 21.

When the uniformly charged photoconductor 21 is selectively exposed to the light signal by use of the LED array, the potential at the light-exposed portions of the photoconductive layer 27 is rapidly decreased, thereby generating the potential difference on the photoconductive layer 27. Depending on the potential difference on the photoconductive layer 27, the toner particles attached to the magnetic brush are freed from the magnetic force or the electrostatic charge exerted thereon by the magnetic brush, separated therefrom, and then deposited to the surface of the photoconductive layer 27.

Even after the photoconductive layer 27 of the photoconductor 21 is separated from the developer in the developer resident portion 73 while the photoconductor 21 is rotated in the direction of the arrow P and the sleeve 35 is rotated in the direction of the arrow S, the above-mentioned toner particles attached to the photoconductive layer 27 remains as they are, so that a toner image 75 can be formed on the surface of the photoconductor 21. In such a development process, since the magnetic brush composed of the magnetic carrier particles is stable, the quantity of the developer in the developer resident portion 73 can be maintained. As a result, sharp and stable images can be obtained.

Figure 5:
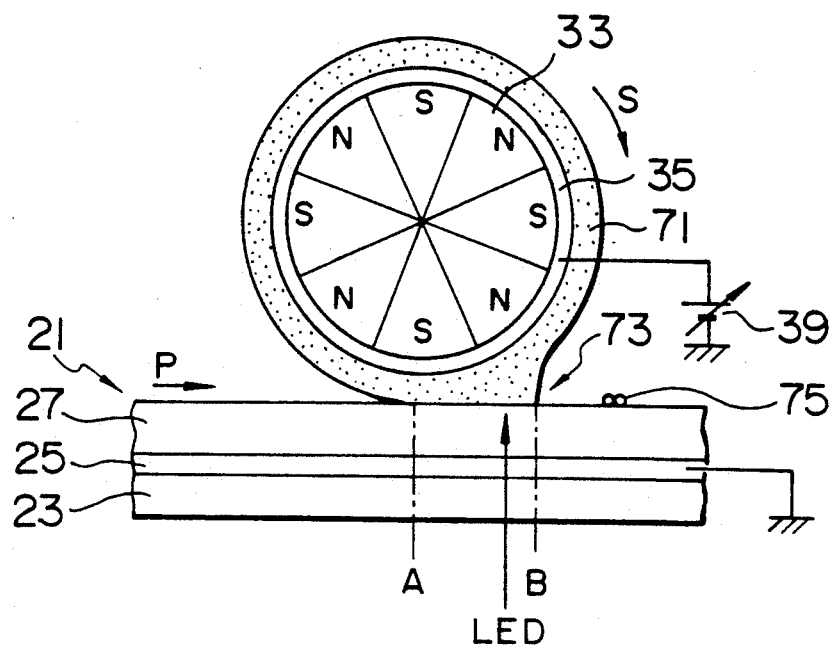
FIG. 5 is a partially sectional view of a photoconductor and a development means for use in one embodiment of the image formation method according to the present invention.

In the exposure process by use of the LED array, as previously mentioned, the light signal corresponding to the original image is applied to the photoconductor 21, not at the point A illustrated in FIG. 5 where the sleeve 35 of the development unit 31 comes to the position nearest the photoconductor 21, but at the area adjacent to the developer resident portion 73, lower than the point A in the rotational direction of the photoconductor 21. In particular, it is most preferable that the light signal be applied to the photoconductor 21 at the end point (a point B illustrated in FIG. 5) where the developer 71 is separated from the photoconductor 21.

Since the exposure of the photoconductor 21 to the light signal is conducted at the above-mentioned point in the present invention, the application of the development bias voltage to the photoconductor 21 can be sufficiently stabilized by the time when the exposure process is started. Consequently, the surface of the photoconductor 21 can be uniformly charged regardless of the influence of the hysteresis exerted thereon, and the residual toner remaining on the surface of the photoconductor 21 can be satisfactorily recovered. In addition, since the photoconductor 21 is exposed to the light signal to generate the photocarriers after the application of the development bias voltage to the photoconductor 21 is sufficiently stabilized, excellent toner images 75 can be formed on the photoconductor 21. Since the photoconductor 21 is speedily separated from the developer resident portion 73 after the formation of the toner images 75, the toner images 75 on the photoconductor 21 are not impaired by the mechanical shock such as the collision or friction between the toner images 75 and the developer 71. Thus, toner images 75 with excellent resolution can be obtained.

Furthermore, the distance between the surface of the photoconductor 21 and the surface of the magnetic roller 33 of the development unit 31 is longer at the point B of the photoconductor 21 as illustrated in FIG. 5, adjacent to the developer resident portion 73 as compared with the point A as illustrated in FIG. 5, where the sleeve 35 of the development unit 31 comes to the position nearest the photoconductor 21. Therefore, the magnetic force by which the developer 71 is attracted to the magnetic roller 33 is weaker at the point B of the photoconductor 21, so that part of the toner images 75 which have already been formed on the surface of the photoconductor 21 can be prevented from returning to the development unit 31 by the magnetic force. This can prevent the decrease in image density and resolution of obtained images.

In the image formation method of the present invention, in which the charging, exposure and development are simultaneously carried out, as previously mentioned, it is preferable that the development bias voltage be as low as 250 V or less, more preferably 10 to 200 V, and further preferably 30 to 150 V. The above-mentioned development bias voltage is sufficient to uniformly charge the photoconductor and develop the latent image into the toner image with the developer. Furthermore, in general, when the size of the carrier particle contained in the developer is small, the carrier particles are easily attracted to the photoconductor together with the toner particles in the development procedure. However, the above-mentioned bias voltage is not so high that the carrier particles can be prevented from being attracted to the photoconductor.

In addition, the previously mentioned amorphous silicon based photoconductor is appropriate for the development under application thereto of a low bias voltage.

The dynamic resistivity of the developer 71 can be observed by measuring the electric current flowing to the surface of the photoconductor 21 at the developer resident portion 73. In the present invention, it is preferable that the dynamic resistivity of the developer be $10^7$ $\Omega$ or less, more preferably $10^6$ $\Omega$ or less, and further preferably in the range of $10^4$ to $10^6$ $\Omega$.

In FIG. 3, the toner image 75 formed on the photoconductor 21 is attracted by a transfer roller 53 to which a transfer bias voltage with a negative polarity is applied by a transfer bias source 55 and transferred to the image-receiving sheet 81 in the transfer unit 51.

The toner for use in the present invention has the insulating properties, so that the toner image can be steadily transferred to the image-receiving sheet at high transfer efficiency even though the employed image-receiving sheet is a sheet of plain paper.

Then, in the image-fixing unit 61, the image-receiving sheet 81 carrying the toner image thereon is caused to pass through the gap between a heat-application roller 63 and a pressure-application roller 65 to fix the toner image to the image-receiving sheet 81.

After the image-transfer operation, the residual toner particles on the photoconductor 21 are removed therefrom in such a manner that the toner particles remaining on the photoconductor 21 are attracted to the magnetic brush composed of the carrier particles when the photoconductor 21 reaches the position where the photoconductor 21 is directed toward the development unit 31 and brought into contact with the developer 71. This mechanism necessitates no cleaning member. As a matter of course, a cleaning unit may be provided prior to the development unit 31 in the present invention.

In addition, a quenching means, for example, a quenching light, capable of erasing the residual charge on the photoconductive layer 27 of the photoconductor 21 may be provided between the transfer unit 51 and the development unit 31.

Figure 6:
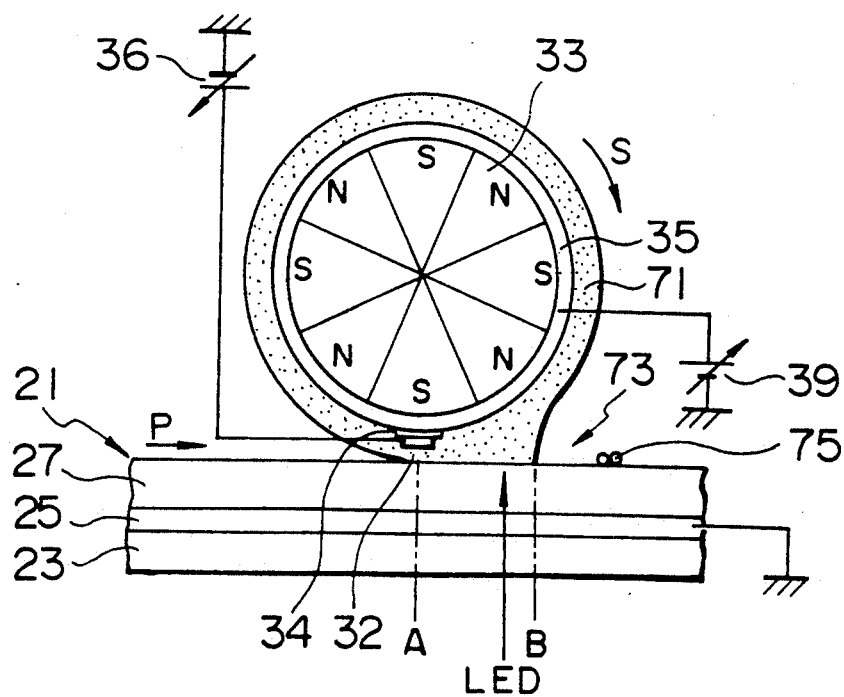
FIG. 6 is a partially sectional view of a photoconductor and a development means for use in another embodiment of the image formation method according to the present invention.

FIG. 6 is a partially sectional view of a photoconductor and a development unit for explaining the another embodiment of the image formation method according to the present invention.

In this embodiment as shown in FIG. 6, a voltage controllable electrode 32 and its attendant members are added to the first embodiment shown in FIGS. 3 to 5.

As shown in FIG. 6, the voltage controllable electrode 32 is provided at the position where the development unit 31 is directed toward the photoconductor 21. Preferably, the voltage controllable electrode 32 is situated upstream in the rotational direction of the photoconductor 21 with respect to the position where the exposure is conducted by use of the LED. In FIG. 6, the voltage controllable electrode 32 is located between the photoconductor 21 and the sleeve 35, where the sleeve 35 of the development unit 31 comes nearest to the photoconductor 21 (at a point A illustrated in FIG. 6).

The voltage controllable electrode 32 is insulated against the sleeve 35 by interposing an insulator 34 between the sleeve 35 and the electrode 32. The voltage controllable electrode 32 and the insulator 34 are not attached to the sleeve 35, but independently disposed between the sleeve 35 and the photoconductor 21, with constantly maintaining their position (the point A as illustrated in FIG. 6) regardless of the rotation of the sleeve 35 and the photoconductor 21.

Independently of the development bias source 39, the voltage is applied to the photoconductor 21 and the developer 71 by a voltage controllable electrode source 36. In addition, to uniformly apply the electric field to the photoconductor 21 and the developer 71, it is desirable that the voltage controllable electrode 32 be a belt-shaped one extending along the length direction of the sleeve 35.

The potential of the voltage controllable electrode 32 can be determined, independently of the potential of the sleeve 35, by controlling the voltage output from the voltage controllable electrode source 36. For example, the potential of the voltage controllable electrode 32, which is grounded, may be equal to that of the light-transmitting electroconductive layer 25 of the photoconductor 21. Alternatively, the potential of the voltage controllable electrode 32 may be higher or lower than that of the sleeve 35.

As shown in FIG. 6, when the voltage controllable electrode 32 capable of applying the electric potential to the photoconductor 21 and the developer 71 is provided independently of the application of the voltage by the sleeve 35, the surface potential of the photoconductor 21 ca be controlled by eliminating the hysteresis of the previous image formation processes exerted on the photoconductor 21. Consequently, the development can be steadily carried out in the case where the photoconductor 21 is caused to rotate several times to obtain images on one image-receiving sheet 81. Thus, excellent images can be obtained.

By controlling the potential of the voltage controllable electrode 32, the image density of the obtained images can be adjusted and the optimal image formation conditions without causing the fogging on the background can be obtained.

According to the image evaluation test which has been conducted by the applicants of the present application, the reversal development in which the toner particles are deposited to the non-exposed portions, and not deposited to the exposed portions on the photoconductor can be accomplished by the image formation method of the present invention by increasing the potential of the voltage controllable electrode 32 and decreasing the potential of the sleeve 35.

As previously explained, the carrier particles and the developer according to the present invention can be adapted to the rear side exposure system. The carrier particles according to the present invention can also be applied to various kinds of image formation methods which require a developer with high electroconductivity and magnetic properties. Therefore, the developer according to the present invention can also be applied to various kinds of image formation methods.

According to the present invention, high electroconductivity and strong magnetic properties can be imparted to the carrier particle. Then, since the thus obtained carrier particle is used with electrically insulating toner to prepare a developer in the present invention, the developer according to the present invention has electroconductivity, and at the same time, the toner image with insulating properties can be produced by using such a developer. Therefore, the toner image obtained by the developer of the present invention can be transferred to a sheet of plain paper by the electrostatic transfer without any difficulty.

According to the image formation method of the present invention, the photoconductor can be uniformly charged and the latent electrostatic images formed on the photoconductor can be steadily developed by using the developer composed of the carrier which comprises a basic particle prepared by dispersing a magnetic material in a binder resin and an electroconductive layer formed on the basic particle, and the toner with electrically insulating properties. Thus, the toner image thus developed by the developer of the present invention can be transferred to an image-receiving sheet by the electrostatic transfer and fixed thereon with high image density.

Other features of this invention will become apparent in the course of the following description of exemplary embodiments which are given for illustration of the invention and are not intended to be limiting thereof.

EXAMPLE

Preparation of Carrier

A mixture of the following components was kneaded and pulverized in a jet-mill, and then classified to obtain a basic particle with an average particle diameter of 23 $\mu$m for use in a carrier particle.

|  | Parts by Weight |
| --- | --- |
| Styrene/n-butyl acrylate copolymer (80:20) | 25 |
| Magnetite | 75 |

100 parts by weight of the above obtained basic particle and 2 parts by weight of electroconductive carbon black particles with an average diameter of 20 to 30 nm were thoroughly mixed in a Henschel mixer, so that electroconductive carbon black particles were uniformly attached to the surface of the basic particle.

Then, the carbon black particles were fixed to the surface of the basic particle by the application of the mechanical shock thereto using a commercially available surface modification apparatus "Hybridization System" (Trademark), made by Nara Machinery Co., Ltd. Thus, the carrier particle according to the present invention was prepared.

The characteristics of the above-prepared carrier particle were as follows:

Volume resistivity: $2 \times 10^3$ Ω·cm

Maximum magnetization (in a magnetic field of 5 kOe): 60 emu/g

Preparation of Toner

A mixture of the following components was kneaded and pulverized in a jet-mill, and then classified to obtain a toner particle with an average particle diameter of 7 μm.

|  | Parts by Weight |
| --- | --- |
| Styrene/n-butyl acrylate copolymer (80:20) | 73 |
| Magnetite | 15 |
| Carbon black | 5 |
| Polypropylene wax | 5 |
| Charge-controlling agent | 2 |

Preparation of Developer 70 parts by weight of the above-prepared carrier particles and 30 parts by weight of the toner particles were uniformly mixed to prepare a developer. The volume resistivity of the obtained developer was $3 \times 10^4$ Ω·cm and the dynamic resistivity of the developer measured at the developer resident portion was $5 \times 10^5$ Ω.

Formation of Images

The above-prepared developer was supplied to an image formation apparatus, as shown in FIGS. 3 and 5, to carry out the image formation.

In the image formation apparatus, a photoconductor comprising a cylindrical glass support with an outer diameter of 30 mm, a light-transmitting electroconductive layer made of ITO formed on the support, and an α-silicon based photoconductive layer formed on the electroconductive layer was employed. The thickness of the photoconductive layer was 6 μm.

The voltage of +50 V was applied to a sleeve of a development unit by a development bias source. With the application of a transfer bias voltage of −200 V to a transfer roller, the toner images were transferred to a sheet of commercially available plain paper in a transfer unit.

When the image formation was carried out at 25° C. and 50% RH, images with an image density of 1.4 were steadily obtained.

What is claimed is:

1. An electroconductive magnetic carrier for use with a developer, comprising basic particles, each of said basic particles comprising a binder resin and a magnetic material dispersed in said binder resin, and an electroconductive layer formed on the surface of said basic particle.

2. The electroconductive magnetic carrier as claimed in claim 1, wherein said electroconductive layer formed on the surface of said basic particle comprises numerous electroconductive particles which are fixed to the surface of said basic particle.

3. The electroconductive magnetic carrier as claimed in claim 2, wherein said electroconductive particles which constitute said electroconductive layer has an average particle diameter of 0.5 μm or less.

4. The electroconductive magnetic carrier as claimed in claim 1 wherein said electroconductive layer is an electroconductive thin film which is formed on the surface of said basic particle.

5. The electroconductive magnetic carrier as claimed in claim 1, having a volume resistivity of $10^5$ Ω·cm or less.

6. The electroconductive magnetic carrier as claimed in claim 1, having a volume resistivity of $10^2$ to $10^4$ Ω·cm.

7. The electroconductive magnetic carrier as claimed in claim 1, having a maximum magnetization of 55 emu/g or more in a magnetic field of 5 kOe.

8. The electroconductive magnetic carrier as claimed in claim 1, having a maximum magnetization of 60 to 85 emu/g in a magnetic field of 5 kOe.

9. The electroconductive magnetic carrier as claimed in claim 1, wherein said magnetic material is contained in an amount of 70 to 90 wt. % in said basic particle.

10. The electroconductive magnetic carrier as claimed in claim 1, having a particle diameter of 5 to 100 μm.

11. The electroconductive magnetic carrier as claimed in claim 1, having a true density of 3.0 to 4.5 g/cm$^3$.

12. An electroconductive magnetic carrier for use in a developer, comprising basic particles, each of said basic particles comprising a binder resin and a magnetic material dispersed in said binder resin, and an electroconductive layer comprising electroconductive particles fixed to the surface of said basic particle, said magnetic material being contained in an amount of 70 to 90 wt. % in said binder resin, and said electroconductive magnetic carrier having a volume resistivity of $10^5$ Ω·cm or less, a maximum magnetization of 55 emu/g or more in a magnetic field of 5 kOe, a particle diameter of 5 to 100 μm, and a true density of 3.0 to 4.5 g/cm$^3$.

13. The electroconductive magnetic carrier as claimed in claim 12, having a volume resistivity of $10^2$ to $10^4$ Ω·cm.

14. The electroconductive magnetic carrier as claimed in claim 12, having a maximum magnetization of 60 to 85 emu/g in a magnetic field of 5 kOe.

15. A developer comprising (a) an electroconductive magnetic carrier comprising basic particles, each of said basic particles comprising a binder resin and a magnetic material dispersed in said binder resin, and an electroconductive layer formed on the surface of said basic particle, and (b) an electrically insulating toner.

16. The developer as claimed in claim 15, wherein said toner is a magnetic toner.

17. The developer as claimed in claim 15, wherein said toner is a non-magnetic toner.

18. The developer as claimed in claim 15, wherein said toner has a volume resistivity of $10^{14}$ Ω·cm or more.

19. The developer as claimed in claim 15, wherein the ratio of the particle diameter of said electroconductive magnetic carrier to that of said toner is in the range of 1 to 5.

20. The developer as claimed in claim 15, having a volume resistivity of $10^6$ Ω·cm or less.

21. The developer as claimed in claim 15, having a volume resistivity of $10^3$ to $10^5$ Ω·cm.

22. The developer as claimed in claim 15, wherein the mixing ratio of said toner to said electroconductive magnetic carrier is 10 wt. % or more.

23. The developer as claimed in claim 15, wherein the mixing ratio of said toner to said electroconductive magnetic carrier is in the range of 20 to 50 wt. %.

24. The developer as claimed in claim 15, wherein said electroconductive layer formed on the surface of said basic particle comprises numerous electroconductive particles which are fixed to the surface of said basic particle.

25. The developer as claimed in claim 15, wherein said carrier comprising basic particles, each of said basic particles comprising a binder resin and a magnetic material dispersed in said binder resin, and an electroconductive layer comprising electroconductive particles fixed to the surface of said basic particle, said magnetic material being contained in an amount of 70 to 90 wt. % in said binder resin, and said electroconductive magnetic carrier having a volume resistivity of $10^5$ Ω·cm or less, a maximum magnetization of 55 emu/g or more in a magnetic field of 5 kOe, a particle diameter of 5 to 100 μm, and a true density of 3.0 to 4.5 g/cm$^3$.

26. A developer comprising (a) an electroconductive magnetic carrier comprising basic particles, each of said basic particles comprising a binder resin and a magnetic material dispersed in said binder resin, and an electroconductive layer formed on the surface of said basic particle, and (b) a toner, said toner being an electrically insulating toner having a volume resistivity of $10^{14}$ Ω·cm or more, the ratio of the particle diameter of said electroconductive magnetic carrier to that of said toner being in the range of 1 to 5, the mixing ratio of said toner to said electroconductive magnetic carrier being 10 wt. % or more, and said developer having a volume resistivity of $10^6$ Ω·cm or less.

27. The developer as claimed in claim 26, having a volume resistivity of $10^3$ to $10^5$ Ω·cm.

28. The developer as claimed in claim 26, wherein the mixing ratio of said toner to said electroconductive magnetic carrier is in the range of 20 to 50 wt. %.

29. The developer as claimed in claim 26, wherein said electroconductive layer formed on the surface of said basic particle comprises numerous electroconductive particles which are fixed to the surface of said basic particle.

30. The developer as claimed in claim 26, wherein said carrier comprising basic particles, each of said basic particles comprising a binder resin and a magnetic material dispersed in said binder resin, and an electroconductive layer comprising electroconductive particles fixed to the surface of said basic particle, said magnetic material being contained in an amount of 70 to 90 wt. % in said binder resin, and said electroconductive magnetic carrier having a volume resistivity of $10^5$ Ω·cm or less, a maximum magnetization of 55 emu/g or more in a magnetic field of 5 kOe, a particle diameter of 5 to 100 μm, and a true density of 3.0 to 4.5 g/cm$^3$.

31. The electroconductive magnetic carrier as claimed in claim 1, wherein said electroconductive layer is formed of a material selected from the group consisting of carbon black, tin oxide, titanium oxide, indium-tin oxide, indium oxide, silicon carbide, aluminum, nickel, chromium and gold.

32. The electroconductive magnetic carrier as claimed in claim 12, wherein said electroconductive layer is formed of a material selected from the group consisting of carbon black, tin oxide, titanium oxide, indium-tin oxide, indium oxide, silicon carbide, aluminum, nickel, chromium and gold.

33. The developer as claimed in claim 15, wherein said electroconductive layer is formed of a material selected from the group consisting of carbon black, tin oxide, titanium oxide, indium-tin oxide, indium oxide, silicon carbide, aluminum, nickel, chromium and gold.

34. The developer as claimed in claim 26, wherein said electroconductive layer is formed of a material selected from the group consisting of carbon black, tin oxide, titanium oxide, indium-tin oxide, indium oxide, silicon carbide, aluminum, nickel, chromium and gold.

* * * * *